US010449989B2

(12) United States Patent
Nishio et al.

(10) Patent No.: US 10,449,989 B2
(45) Date of Patent: Oct. 22, 2019

(54) STEERING WHEEL HEATER DEVICE

(71) Applicant: Panasonic Intellectual Property Management Co., Ltd., Osaka (JP)

(72) Inventors: Tsuyoshi Nishio, Chiba (JP); Hiroshi Naitou, Osaka (JP); Baku Sakaguchi, Osaka (JP); Shinji Fujikawa, Osaka (JP); Yuta Okazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 554 days.

(21) Appl. No.: 14/890,148

(22) PCT Filed: Dec. 4, 2014

(86) PCT No.: PCT/JP2014/006067
§ 371 (c)(1),
(2) Date: Nov. 9, 2015

(87) PCT Pub. No.: WO2015/087520
PCT Pub. Date: Jun. 18, 2015

(65) Prior Publication Data
US 2016/0101805 A1 Apr. 14, 2016

(30) Foreign Application Priority Data

Dec. 12, 2013 (JP) ................. 2013-257403
Jul. 23, 2014 (JP) ................. 2014-150228

(51) Int. Cl.
*B62D 1/06* (2006.01)
*H05B 6/02* (2006.01)
*B60L 1/02* (2006.01)

(52) U.S. Cl.
CPC ................ *B62D 1/065* (2013.01); *B60L 1/02* (2013.01); *H05B 6/02* (2013.01)

(58) Field of Classification Search
CPC ........ H05B 2203/003; H05B 2203/007; H05B 3/34; H05B 6/02; H05B 1/0236;
(Continued)

(56) References Cited

U.S. PATENT DOCUMENTS 6,512,202 B2 * 1/2003 Haag ...................... B62D 1/065
219/204
6,703,845 B2 * 3/2004 Stanley ................. B60N 2/002
280/735

(Continued)

FOREIGN PATENT DOCUMENTS

JP 2002-340712 11/2002
JP 2003-535341 11/2003
(Continued)

OTHER PUBLICATIONS

International Search Report of PCT application No. PCT/JP2014/006067 dated Feb. 10, 2015.

*Primary Examiner* — Tu B Hoang
*Assistant Examiner* — Diallo I Duniver
(74) *Attorney, Agent, or Firm* — Greenblum & Bernstein, P.L.C.

(57) ABSTRACT

A steering wheel heater device including: a steering wheel heater configured of an electrical resistor which produces heat by electrical energy; an inductor; at least one switch; and a sensor circuit, wherein the inductor is connected in series to a first terminal of the steering wheel heater, the at least one switch turns on and off the supply of power to the steering wheel heater, the sensor circuit is electrically connected to the first terminal and determines whether a detected subject is in contact with a steering wheel based on a magnitude of capacitance of the steering wheel heater, and the at least one switch is at least one of a switch connected in series to the first terminal of the steering wheel heater via the inductor and a switch connected in series to a second terminal of the steering wheel heater.

6 Claims, 14 Drawing Sheets

(58) Field of Classification Search
CPC ............... H05B 1/0238; H05B 3/0042; H05B
2203/035; H05B 2203/029; B60L 1/02;
B60L 1/00; B62D 1/065; B62D 1/043;
B62D 1/04; B62D 1/046; B62D 1/06;
B62D 1/10; H01H 37/00
USPC ....... 219/204, 202, 201, 538, 217, 200, 209,
219/524, 520
See application file for complete search history.

(56) References Cited

U.S. PATENT DOCUMENTS

| | | |
|---|---|---|
| 2001/0045733 A1 | 11/2001 | Stanley et al. |
| 2002/0170900 A1 | 11/2002 | Braeuchle et al. |
| 2008/0017625 A1 | 1/2008 | Ito et al. |
| 2010/0038351 A1* | 2/2010 | Tabaczynski ............. B60L 1/08 219/202 |
| 2011/0121618 A1* | 5/2011 | Fischer ................. B60N 2/002 297/180.12 |
| 2013/0098890 A1 | 4/2013 | Virnich et al. |

FOREIGN PATENT DOCUMENTS

| | | | | |
|---|---|---|---|---|
| JP | 2005-297704 | | 10/2005 | |
| JP | 2007-284033 | | 11/2007 | |
| JP | 2008-024087 | | 2/2008 | |
| JP | 2010023699 A | * | 2/2010 | |
| WO | WO-2012123444 A1 | * | 9/2012 | ............. A47C 7/748 |

* cited by examiner

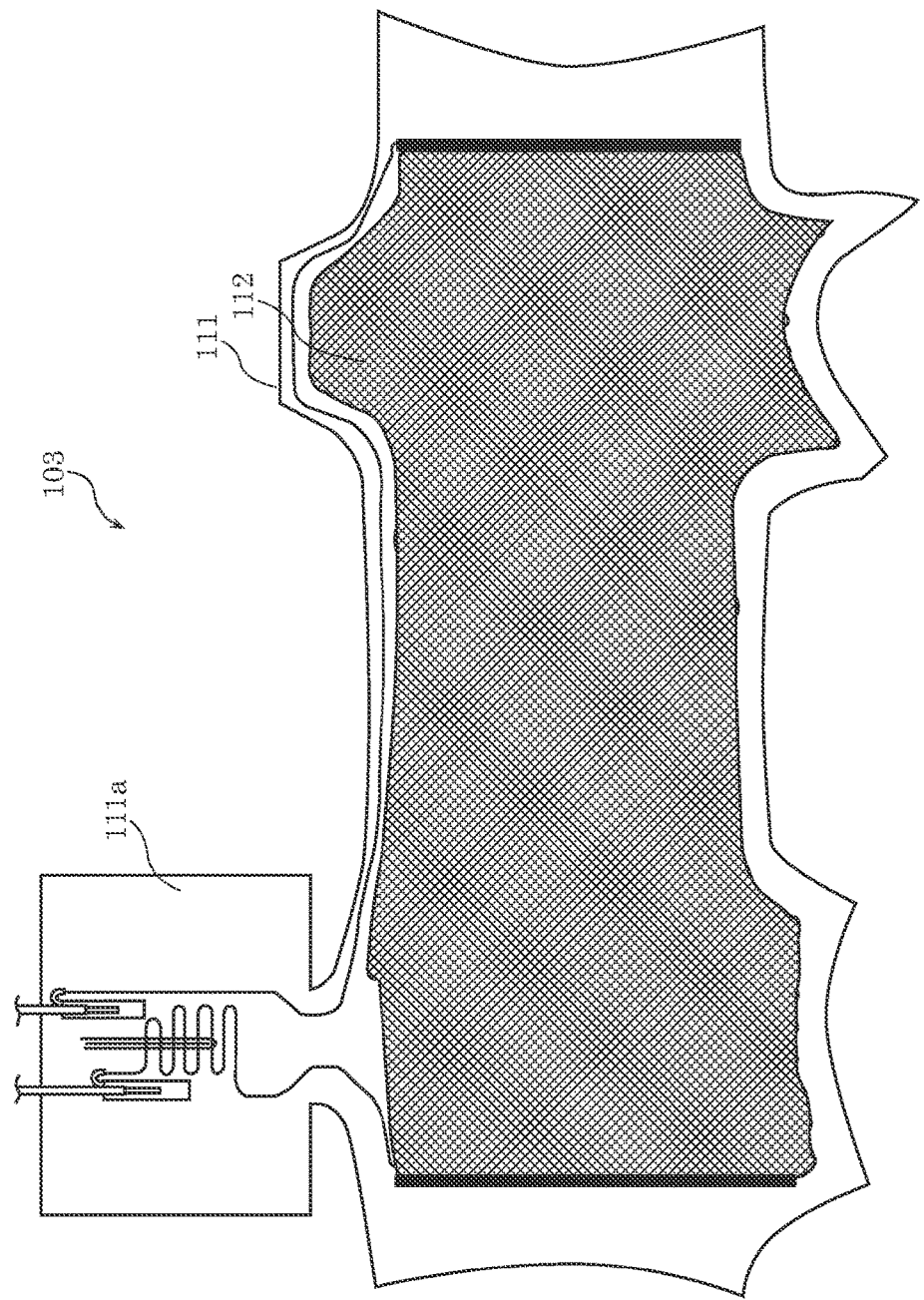

STEERING WHEEL HEATER DEVICE

CROSS-REFERENCE TO RELATED APPLICATIONS

This application is a U.S. national stage application of the PCT International Application No. PCT/JP2014/006067 filed on Dec. 4, 2014, which claims the benefit of foreign priority of Japanese patent applications 2014-150228 filed on Jul. 23, 2014 and 2013-257403 filed on Dec. 12, 2013, the contents all of which are incorporated herein by reference.

TECHNICAL FIELD

The present disclosure relates to a steering wheel heater device to be included in a steering wheel.

BACKGROUND ART

Patent Literature (PTL) 1 discloses a detection device which achieves detection as to whether a human hand is in contact with a steering wheel, taking advantage of characteristics of an oscillator circuit in that the frequency of the oscillator circuit changes as capacitance changes.

Meanwhile, PTL 2 discloses a vehicle seat apparatus which makes use of a seat heater to detect whether a passenger is being seated. The vehicle seat apparatus serves as a seat heater and also as an electrode for detecting whether the passenger is being seated. Thus, an oscillator circuit is obviated, and cost is reduced.

FIG. 12 is a schematic sectional view of a vehicle seat apparatus in a conventional technique (see PTL 2).

In the figure, seat heater 8 is included in a seat of a vehicle seat apparatus 1, and connected via coupling capacitor 22 to seating detection circuit 14. Seat heater 8 is supplied with power via seat-heater release switches 11 and 12. Seating detection circuit 14 detects passenger's action of seating himself/herself on the vehicle seat apparatus 1, when seat-heater release switches 11 and 12 are off. Specifically, seating detection circuit 14 includes an alternating-current (AC) power source, a band-pass filter, a detection-and-smoothing circuit, an amplifier circuit, an analog-to-digital converter, and a microcomputer. The band-pass filter can be configured with a resonant filter which passes a predetermined frequency value output by the AC power source. An alternating voltage component extracted from the band-pass filter is detected and smoothed by the detection-and-smoothing circuit, increased by the amplifier circuit to predetermined amplitude, converted by the analog-to-digital converter into a digital signal, and then loaded into the microcomputer. The microcomputer determines that a passenger is being seated if the digital signal loaded is less than a predetermined threshold.

As such, PTL 2 discloses making use of a heater wire as one electrode of capacitance for detecting whether the passenger is being seated. Here, to use the heater wire as an electrode for the detection, the electrode need be floating, and thus seat-heater release switches 11 and 12 are provided to isolate seat heater 8 from GND (a ground level). Typically, seat-heater release switches 11 and 12 are on, that is, in an energized state, when a heater wire is warming, and are off, that is, in a blocked state, when seating detection circuit 14 is in operation.

CITATION LIST

Patent Literature

PTL 1: Unexamined Japanese Patent Publication No. 2002-340712

PTL 2: Unexamined Japanese Patent Publication No. 2008-24087

SUMMARY OF THE INVENTION

The present disclosure provides a steering wheel heater device which detects whether a human hand is in contact with the steering wheel heater even if the steering wheel heater is being energized.

A steering wheel heater device according to one aspect of the present disclosure includes a steering wheel heater configured of an electrical resistor which produces heat by electrical energy and included in a steering wheel; a first inductor; at least one switch; and a sensor circuit. The first inductor is connected in series to a first terminal of the steering wheel heater. The at least one switch turns on and off supply of power to the steering wheel heater. The sensor circuit is electrically connected to the first terminal and determines whether a detected subject is in contact with the steering wheel heater, based on a magnitude of capacitance of the steering wheel heater. The at least one switch is at least one of a first switch connected in series via the first inductor to the first terminal of the steering wheel heater and a second switch connected in series to the second terminal of the steering wheel heater.

With this configuration, the first inductor is disposed between the sensor circuit and the switch, and thus even when the supply of power to the steering wheel heater is turned on by the at least one switch all turning on, impedance on the side of the switch, when seen from the sensor circuit, is AC high impedance. Thus, the sensor circuit can detect whether the detected subject, such as a human hand, is in contact with the steering wheel even when the steering wheel heater is placed in the energized state.

BRIEF DESCRIPTION OF DRAWINGS

FIG. 6 is a diagram of a second configuration example of the steering wheel heater according to exemplary embodiment 1.

DESCRIPTION OF EMBODIMENTS

Figure 12:
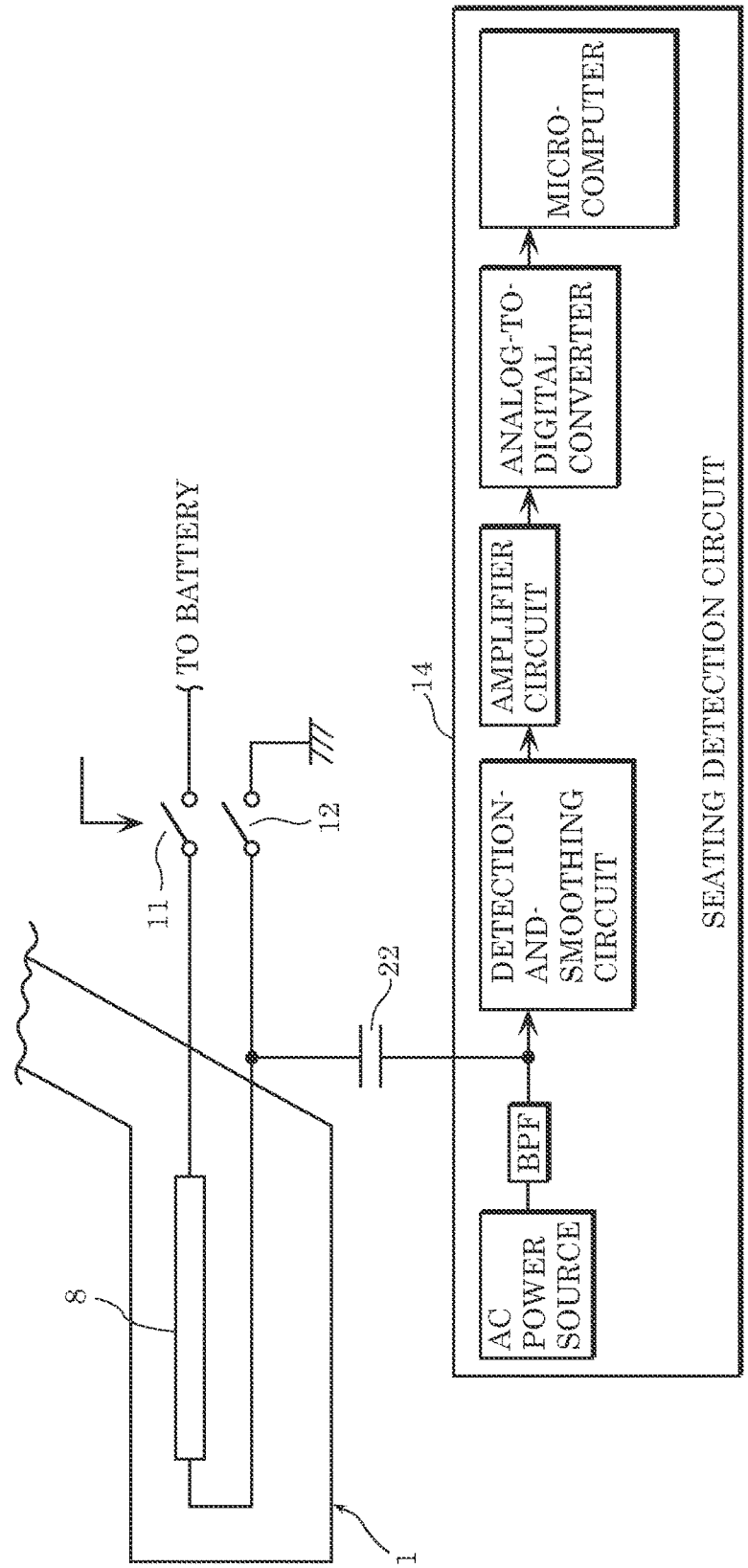
FIG. 12 is a schematic vertical sectional view of a vehicle seat apparatus in a conventional technique.

Prior to describing exemplary embodiments of the present disclosure, problems with the conventional techniques are now described. As described above, in the vehicle seat apparatus shown in FIG. 12, seating detection circuit 14 provides seat heater 8 with an alternating-current (AC) signal via a coupling capacitor to detect the magnitude of the capacitance of seat heater 8. If seat-heater release switch 12 is on, one end of coupling capacitor 22 of seat heater 8 is grounded. Thus, seating detection circuit 14 is allowed to detect whether a passenger is being seated only when seat-heater release switches 11 and 12 are off, that is, in the blocked state. Specifically, there arises a problem that seating detection circuit 14 is not allowed to detect whether the passenger is being seated when seat-heater release switches 11 and 12 are in an on-state, that is, when seat heater 8 is in the energized state.

Based on the following knowledge, the inventors have found that the following problems arise.

The technique disclosed in the conventional technique (PTL 2) of making use of the seat heater also as the circuit for detecting whether contact is made with a human body can be diverted to make use of a steering wheel heater included in a steering wheel as a circuit for detecting whether contact is made with a human hand. If a seat heater-cum-detection circuit is diverted to a steering wheel heater-cum-detection circuit, however, the following new problem is posed, in addition to the problem already described that the detection as to whether the person is being seated is not allowed while the steering wheel heater is being heating, that is, while the steering wheel heater is in the energized state.

Figure 13:
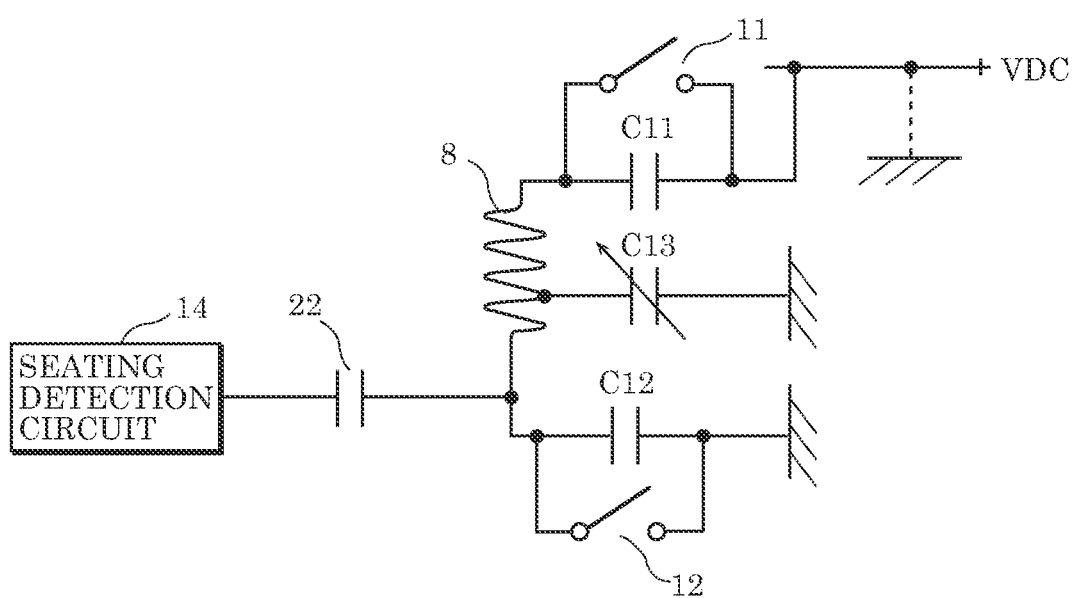
FIG. 13 is an equivalent circuit diagram when switches included in a vehicle seat apparatus are off in a conventional technique.

The new problem is now described, with reference to the accompanying figure. FIG. 13 is an equivalent circuit diagram when switches included in the vehicle seat apparatus are off in a conventional technique. The figure illustrates parasitic capacitance C11 when seat-heater release switch 11 is off, and parasitic capacitance C12 when seat-heater release switch 12 is off, and capacitance C13 of a heater wire whose capacitance varies as a human body approaches.

Typically, seat heater 8 is designed to pass a large current therethrough in order to warm up quickly. Moreover, on/off control is frequently provided to switch operation between seat heater 8 and seating detection circuit 14, and therefore switches 11 and 12 are generally each configured of a semiconductor device that has low on-resistance Ron. A semiconductor device that has low on-resistance Ron generally has large parasitic capacitance. In FIG. 13, capacitance C13, which varies as a human body approaches, and parasitic capacitance C12 of seat-heater release switch 12 are connected in parallel.

In doing so, changes in amount of capacitance depending on whether the passenger is being seated, when seen from seating detection circuit 14, is substantially reduced, ending up reducing the sensitivity of seating detection circuit 14. In particular, the contact area of a human hand with the steering wheel heater is smaller than the contact area of a human body being seated, ending up with further reduction in sensitivity. Specifically, a ratio of capacitance C13 to parasitic capacitance C12 is small (e.g., about 10-fold to about 100-fold smaller than parasitic capacitance C12), which leads to poor sensitivity of a detection circuit, that is, a poor S/N ratio.

Outline of the Present Disclosure

To address such problems, a steering wheel heater device according to one aspect of the present disclosure includes a steering wheel heater configured of an electrical resistor which produces heat by electrical energy and included in a steering wheel; a first inductor; at least one switch; and a sensor circuit. The first inductor is connected in series to a first terminal of the steering wheel heater. The at least one switch turns on and off supply of power to the steering wheel heater. The sensor circuit is electrically connected to the first terminal and determines whether a detected subject is in contact with the steering wheel heater, based on a magnitude of capacitance of the steering wheel heater. The at least one switch is at least one of a first switch connected in series via the first inductor to the first terminal of the steering wheel heater and a second switch connected in series to the second terminal of the steering wheel heater.

According to this, the first inductor is disposed between the sensor circuit and the switch, and thus even when the supply of power to the steering wheel heater is turned on by the at least one switch all turning on, AC impedance on the side of the switch, when seen from the sensor circuit, is high. Thus, the sensor circuit can detect whether the detected subject, such as a human hand, is in contact with the steering wheel even when the steering wheel heater is placed in the energized state. Additionally, since the first inductor is disposed between the sensor circuit and the parasitic capacitance of the switch even when the switch is off, the reduction in sensitivity of the sensor circuit can be inhibited.

Herein, the second terminal may be connected to the at least one switch or a power line, without an intervening inductive element. For example, the steering wheel heater itself may have sufficiently large inductance components. In such a case, an inductive element may be omitted. Thus, as described above, the second terminal may be connected to the at least one switch or a power line, without an intervening inductive element. According to this, an inductive element is not included between the second terminal and the switch or the power line. This achieves a simplified configuration.

Herein, the steering wheel heater device may further include a controller for determining valid periods in which the sensor circuit determines whether the detected subject is in contact with the steering wheel heater, and disabling the sensor circuit during periods other than the valid periods, the valid periods synchronizing with an on-state and an off-state of the supply of power to the steering wheel heater.

According to this, the controller can more accurately determine if contact is made with a human hand, eliminating the effects of transition between an on-state and an off-state of the supply of power to the steering wheel heater. In other words, the controller can more accurately determine if contact is made with the human hand, eliminating the effects of transition between an on-state and an off-state of the switch.

Herein, the controller may determine as one of the valid periods a period within a period of the on-state of the supply of power to the steering wheel heater. According to this, the controller can determine if contact is made with the detected subject such as a human hand even when the supply of power to the steering wheel heater is in the on-state.

Herein, the controller may determine periods to be the valid periods, excluding transition from the off-state to a stable on-state where the supply of power to the steering wheel heater is stably on and transition from the on-state to a stable off-state where the supply of power to the steering wheel heater is stably off. According to this, the controller causes the sensor circuit to operate, avoiding switching transients of the supply of power to the steering wheel heater, thereby avoiding effects of transient noise.

Herein, the steering wheel heater may include a heating wire connected between the first terminal and the second terminal and repeatedly bent. According to this, the steering wheel heater itself has inductance, and thus implementation of a second inductor can be omitted.

Herein, the steering wheel heater may include a planar electrical resistor connected between the first terminal and the second terminal. According to this, the capacitance of the planar electrical resistor further increases, and thus the sensitivity for contact with a human hand can further be enhanced.

Herein, the steering wheel heater device may include a plurality of steering wheel heaters including the steering wheel heater which are included in the steering wheel; and a plurality of first inductors including the first inductor. The plurality of first inductors are connected in series to first terminals of the plurality of steering wheel heaters. The at least one switch may be at least one of a first switch connected via the plurality of first inductors to the first terminals of the plurality of steering wheel heaters and a second switch connected to second terminals of the plurality of steering wheel heaters. According to this, contact of a human hand can be detected not only on the circumference but also on an arbitrary location of the steering wheel, irrespective of whether the steering wheel is being heated or not.

Herein, the controller may enable the sensor circuit while switching between the plurality of steering wheel heaters in a time-sharing manner. According to this, the sensor circuit can be shared between the plurality of steering wheel heaters.

Herein, the controller may enable the sensor circuit in a manner that the sensor circuit concurrently determines whether the detected subject is in contact with at least two of the plurality of steering wheel heaters. According to this, whether the human hand is in contact with the plurality of steering wheel heaters can be determined concurrently.

Herein, the electrical energy may be direct-current electrical energy. According to this, the steering wheel heater device can readily be supplied with electrical energy from a vehicle, such as a car, loaded with a battery.

Herein, the sensor circuit may output an alternating-current signal to the steering wheel heater via the first terminal and detect a level of a signal input from the steering wheel heater via the first terminal to determine whether the detected subject is in contact with the steering wheel. According to this, the sensor circuit may provide output to and receive input from the first terminal only. This obviates the need for an input line and an output line, thereby simplifying the circuit structure.

Hereinafter, embodiments according to the present disclosure will be described, with reference to the accompanying drawings. The exemplary embodiments described below are generic and specific illustration of the present disclosure. Values, shapes, materials, components, and arrangement or connection between the components described in the following exemplary embodiments are merely illustrative, and are not intended to limit the present disclosure. Therefore, among components in the following exemplary embodiments, components not recited in any one of the independent claims indicating the top level concept of the present disclosure are described as arbitrary components.

Exemplary Embodiment 1

Figure 1:
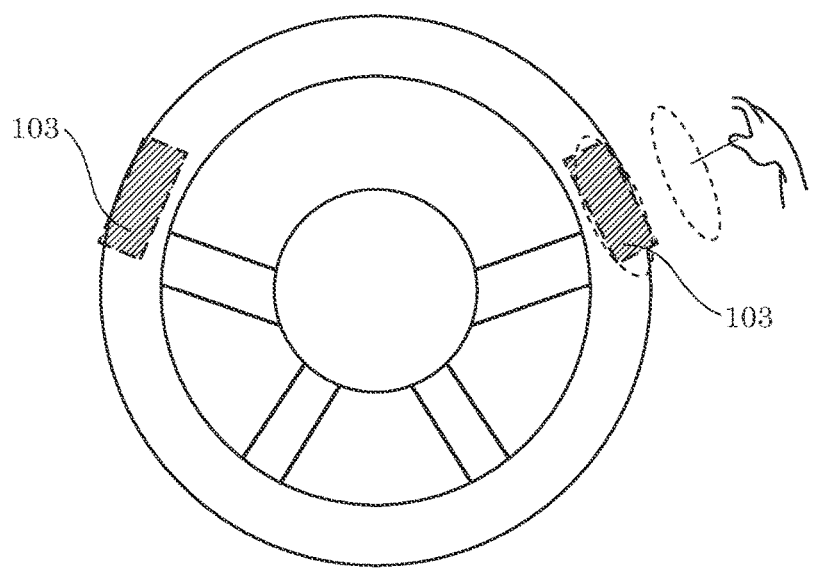
FIG. 1 is a diagram showing an example of a steering wheel which includes steering wheel heaters doubling as devices for detecting whether a human hand is in contact with the steering wheel, according to exemplary embodiment 1.

FIG. 1 is a diagram showing an example of a steering wheel which includes steering wheel heater devices doubling as devices for detecting contact of a human hand, according to exemplary embodiment 1.

As shown in the figure, steering wheel heater 103 is included in a steering wheel of a vehicle, a ship, an aircraft, a spacecraft, or any other means of transportation, for example, and serves as a heater for warming the steering wheel and also as a device for determining contact of a human hand with the steering wheel. Steering wheel heater 103 is configured of an electrical resistor which produces heat by electrical energy supplied by power source VDC. In the figure, two of steering wheel heaters 103 are included in one steering wheel. However, one steering wheel heater 103 or three or more steering wheel heaters 103 may be included. Also, steering wheel heater 103 may be built in the steering wheel or may optionally be attached to the steering wheel.

Figure 2:
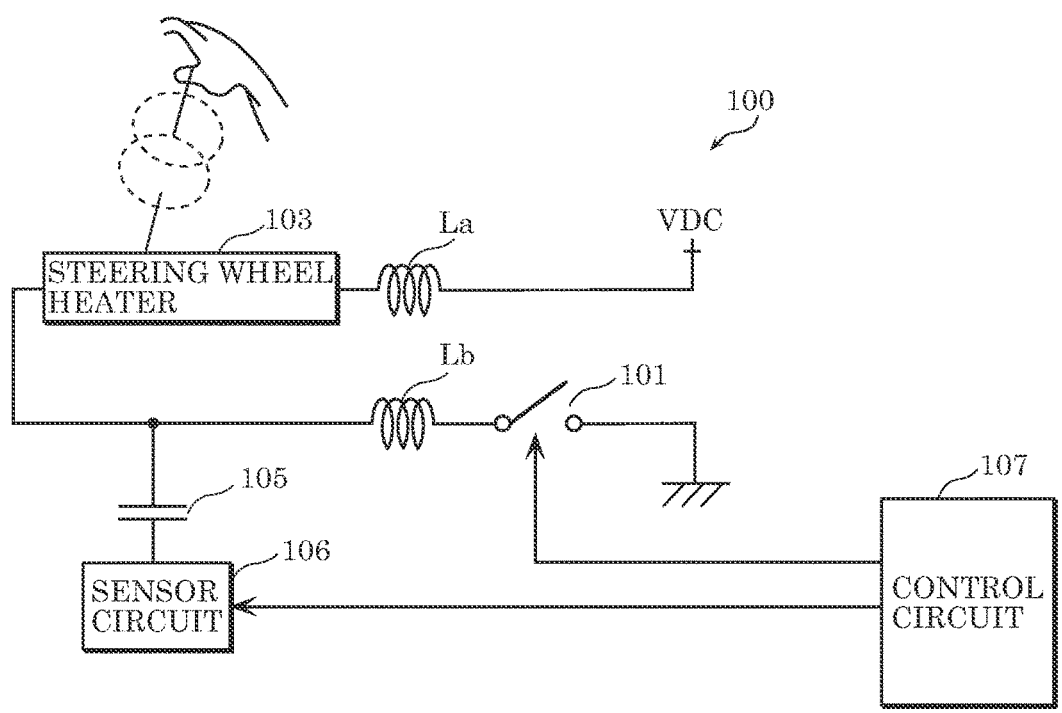
FIG. 2 is a block diagram of a configuration example of a steering wheel heater device according to exemplary embodiment 1.

FIG. 2 is a block diagram of a configuration example of steering wheel heater device 100 according to exemplary embodiment 1. As shown in the figure, steering wheel heater device 100 includes switch 101, inductors La and Lb, steering wheel heater 103, coupling capacitor 105, sensor circuit 106, and control circuit 107. It should be noted the configuration example of FIG. 2 corresponds to one of the two steering wheel heaters 103 shown in FIG. 1. In other words, two steering wheel heater devices are depicted in FIG. 1.

In FIG. 2, switch 101 is a transistor switch which is connected in series via inductor Lb to a first terminal of steering wheel heater 103 and turns on and off the supply of power to steering wheel heater 103. Switch 101 turns on and off, in response to a switch control signal from control circuit 107.

Inductor La is an inductive element (e. g., a coil) having inductance, connected in series to a second terminal of steering wheel heater 103 and connected to a power line of power source VDC. Power source VDC is a battery or the like for a vehicle (such as a car) equipped with a steering wheel, and supplies direct-current (DC) electrical energy. The output voltage of power source VDC is a DC voltage, for example, 12 V or 24 V.

Inductor Lb is connected in series to the first terminal of steering wheel heater 103 and connected to a non-grounded side terminal of switch 101.

Steering wheel heater 103 has both ends connected in series to inductors La and Lb, respectively, and receives the supply of DC power when switch 101 is on. Steering wheel heater 103 is a planar heating element which, for example, includes a repeatedly-bent heating wire and is wrapped around or built in the steering wheel.

Coupling capacitor 105 is a capacitor element which prevents a direct-current (DC) connection between sensor circuit 106 and the above-mentioned first terminal of steering wheel heater 103, and provides an electrical (alternating-current ((AC)) connection between them.

Even when switch 101 is in the on-state or when it is in the off-state, sensor circuit 106 determines whether the steering wheel heater and a human hand are in contact, based on the magnitude of the capacitance between steering wheel heater 103 and the human hand. Specifically, sensor circuit 106 outputs an AC signal (e. g., a periodic pulse signal) via coupling capacitor 105 to steering wheel heater 103 and, consequently, determines an AC signal level (e. g., smoothed level) depending on the magnitude of the capacitance between steering wheel heater 103 and the human hand to determine whether steering wheel heater 103 and the human hand are in contact. The operation of sensor circuit 106 is controlled by control circuit 107 (e. g., controlled by an enable signal).

Since inductor Lb is disposed between sensor circuit 106 and switch 101, the AC impedance on the side of switch 101, when seen from sensor circuit 106, is high even when switch 101 is on. Thus, sensor circuit 106 can detect whether the human hand is in contact with the steering wheel even when steering wheel heater 103 is placed in the energized state by switch 101 being in the on-state.

Sensor circuit 106, of course, detects whether the human hand is in contact with the steering wheel also when steering wheel heater 103 is placed in the non-energized state by switch 101 being in the off-state. Additionally, since inductor Lb is disposed between sensor circuit 106 and the parasitic capacitance of switch 101 when switch 101 is off, the reduction in sensitivity of sensor circuit 106 can be inhibited.

Control circuit 107 controls switch 101 and the operation of sensor circuit 106. For example, control circuit 107 provides control so as to cause sensor circuit 106 to operate within periods where switch 101 is in the on-state and in the off-state.

Figure 3:
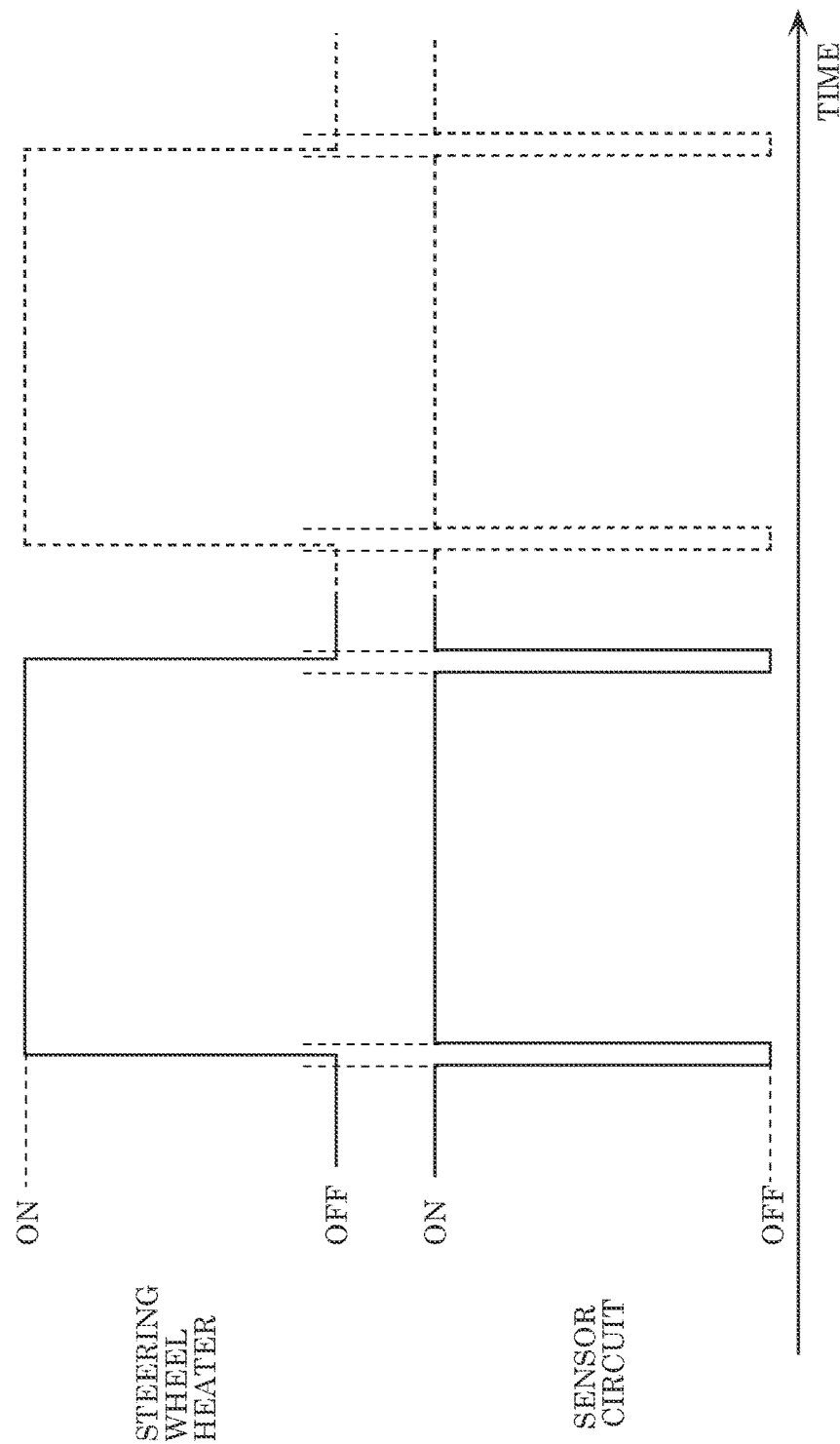
FIG. 3 is a timing diagram depicting operation timings of the steering wheel heater device according to exemplary embodiment 1.

Next, an example of operation timing of steering wheel heater device 100 under control of control circuit 107 is described. FIG. 3 is a timing diagram depicting an example of operation timings of steering wheel heater device 100 according to exemplary embodiment 1.

On top of the figure, periods denoted as ON mean that steering wheel heater 103 is being energized, and periods denoted as OFF mean that steering wheel heater 103 is being non-energized. The switch control signal for controlling the turning on and off of switch 101 indicates whether steering wheel heater 103 is being energized or non-energized. On bottom of the figure, periods denoted as ON mean that sensor circuit 106 is active, and periods denoted as OFF mean that the sensor circuit is inactive. The enable signal for controlling the operation of sensor circuit 106 indicates whether sensor circuit 106 is active or inactive.

The switch control signal and enable signal mentioned above are generated by control circuit 107. In the example of FIG. 3, control circuit 107 provides control to cause sensor circuit 106 to operate during periods other than transition of switch 101 from the off-state to a stable on-state where output of the sensor circuit is stably on, and transition of switch 101 from the on-state to a stable off-state where output of the sensor circuit is stably off. In this manner, sensor circuit 106 is operated in synchronization with the operation of switch 101, that is, in synchronization with the state of supply of power to steering wheel heater 103, avoiding switching transients of switch 101, thereby avoiding effects of transient noise.

It should be noted that, rather than providing control such that sensor circuit 106 is active during ON periods on the bottom of FIG. 3 and be suspended during OFF periods, control circuit 107 may provide control such that sensor circuit 106 is active at all times irrespective of the ON period and the OFF period, and determination results made by sensor circuit 106 are validated during the ON periods and invalidated during the OFF periods. Specifically, control circuit 107 may control valid periods (e. g., the ON periods on the bottom of FIG. 3) during which control circuit 107 validates determination results made by sensor circuit 106. In other words, control circuit 107 may provide control so as to invalidate or ignore determination results made by sensor circuit 106 during periods (e. g., the OFF periods on the bottom of FIG. 3) other than the valid periods. In this case, the enable signal mentioned above is used as a mask signal for masking determination results during periods excluding valid periods and not masking determination results during the valid periods. The transitions to when the output of the sensor circuit is stably on and off, which are not the valid periods, are determined to be invalid periods (e. g., the OFF periods on the bottom of FIG. 3), thereby avoiding the effects of transient noise.

As described above, control circuit 107 determines the valid periods which are synchronizing with the on-state and the off-state of the supply of power to steering wheel heater 103 as shown on the bottom of FIG. 3 and during which sensor circuit 106 determines whether steering wheel heater 103 and a detected subject (e. g., the human hand) are in contact. Specifically, control circuit 107 determines a period, within the period of the on-state of the supply of power to steering wheel heater 103, to be one of the valid periods. Control circuit 107 also determines periods, other than transition of the supply of power to steering wheel heater 103 from the off-state to a stable on-state and transition of the supply of power from the on-state to a stable off-state, to be valid periods. Then, control circuit 107 disables sensor circuit 106 during periods other than the valid periods. Disabling sensor circuit 106 as used herein may be control for suspending the operation of sensor circuit 106 or control by control circuit 107 for ignoring determination results made by sensor circuit 106 even if sensor circuit 106 is active, that is, control for masking the determination results.

Figure 4:
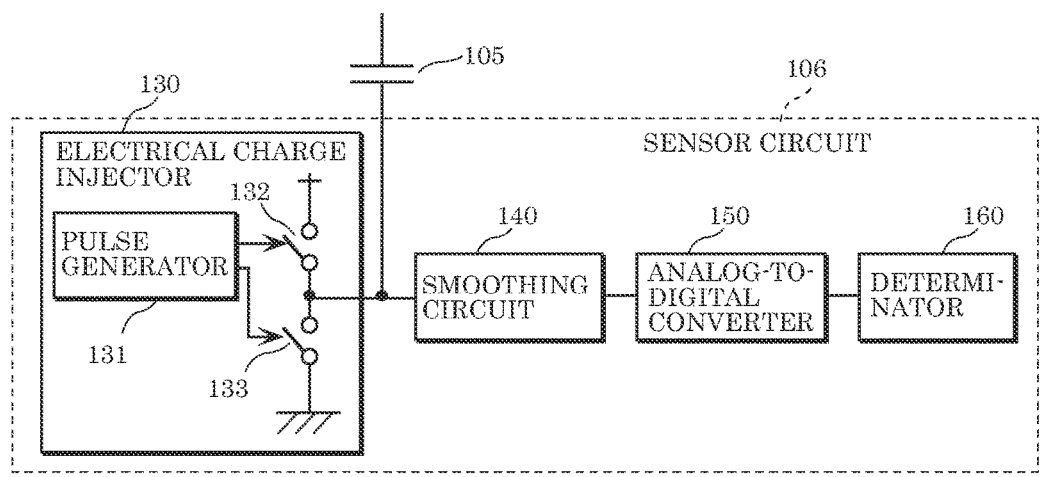
FIG. 4 is a block diagram of a configuration example of a sensor circuit according to exemplary embodiment 1.

Next, a specific example of sensor circuit 106 is described. FIG. 4 is a block diagram of a configuration example of sensor circuit 106 according to exemplary embodiment 1.

As shown in the figure, sensor circuit 106 includes electrical charge injector 130, smoothing circuit 140, analog-to-digital (A/D) converter 150, and determinator 160.

Electrical charge injector 130 includes pulse generator 131, and switches 132 and 133. Electrical charge injector 130 injects electrical charge into steering wheel heater 103 via coupling capacitor 105. Pulse generator 131 produces the AC signal. Switch 132 cycles on and off according to the periodic pulse. Switch 133 is off when switch 132 is on, and is on when switch 132 is off.

Smoothing circuit 140 smoothes a level of the AC signal. A/D converter 150 transforms the smoothed signal level into a digital value.

Determinator 160 compares the digital value from A/D converter 150 with threshold, and determines that the human hand is not in contact with the steering wheel if the digital value exceeds the threshold, that is, if the capacitance is small, and determines that the human hand is in contact with the steering wheel if the digital value is less than the threshold, that is, if the capacitance is large. The threshold is predetermined through experiment or by actual measurement, for example, and updated to a new value through repeated detection as to whether the human hand is in contact with the steering wheel, and stored into determinator 160.

Additionally, determinator 160 determines a distance between the steering wheel and the human hand based on a difference between the digital value and the threshold, if the hand is not in contact with the steering wheel. A table indicating correspondence between the digital value and distance mentioned above is created previously and stored in determinator 160.

As such, determinator 160 makes determinations as a contact sensor and determinations as a proximity sensor.

Figure 5:
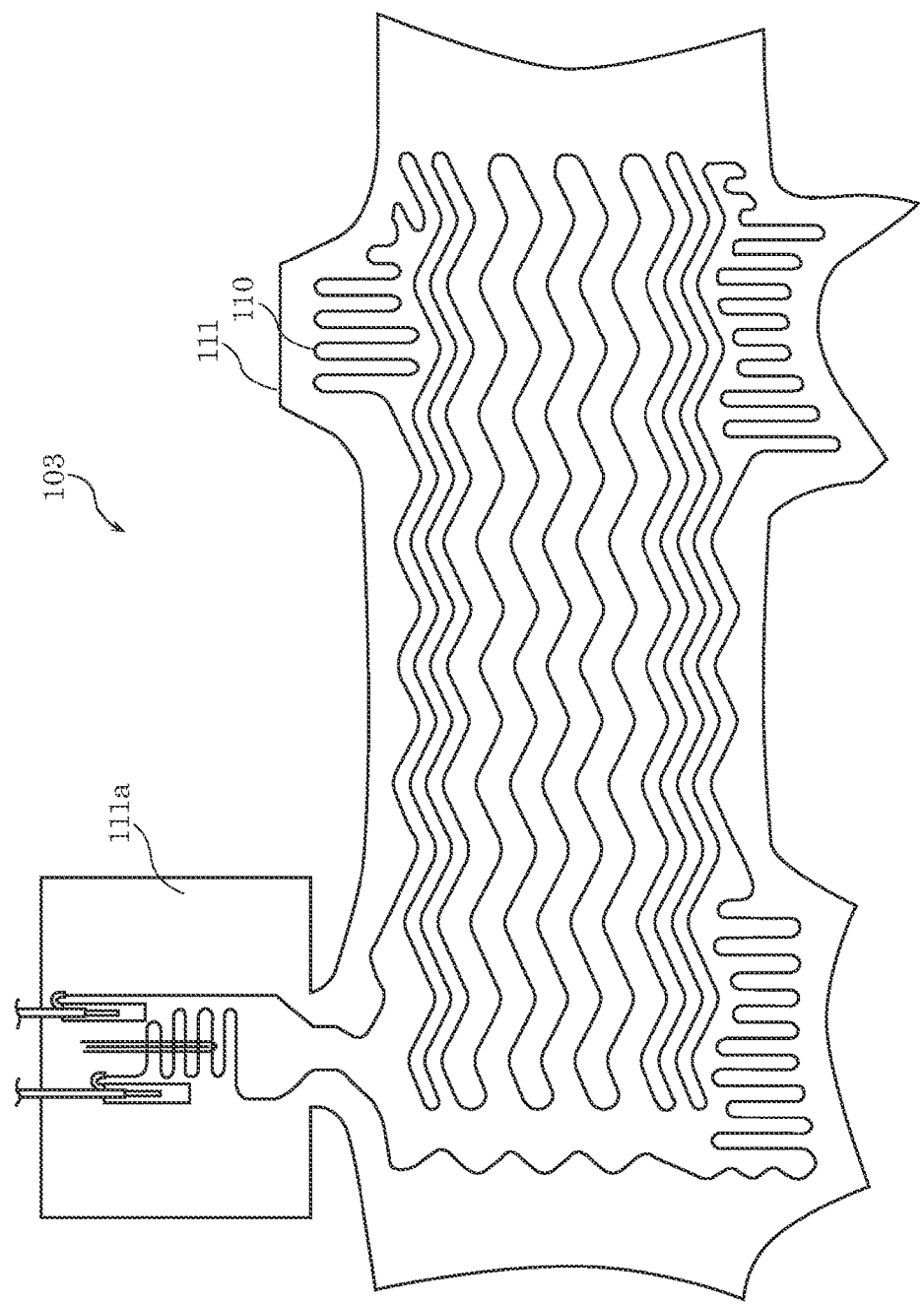
FIG. 5 is a diagram of a first configuration example of the steering wheel heater according to exemplary embodiment 1.

Next, a specific example of the steering wheel heater is described. FIG. 5 is a diagram of a first configuration example of steering wheel heater 103 according to exemplary embodiment 1. Steering wheel heater 103 in the figure includes support 111, and heating wire 110 as an electrical resistor.

Support 111 is formed of nonwovens, for example.

Steering wheel heater 103 includes a planar heating element having flexibility and formed of support 111 and heating wire 110, and is built in or attached to the steering wheel by being wrapped around the steering wheel. Heating wire 110 is repeatedly bent so as to produce heat in a planar fashion. Steering wheel heater 103 further includes connecting member 111a.

The above-mentioned first terminal, of steering wheel heater 103, to which inductor Lb is connected may be a point along or a tip of a lead wire connected to connecting member 111a, or may be connecting member 111a. In the configuration example of steering wheel heater 103 shown in FIG. 5, inductor La can be omitted if steering wheel heater 103 itself has sufficiently large inductance components.

FIG. 6 is a diagram of a second configuration example of steering wheel heater 103 according to exemplary embodiment 1. Steering wheel heater 103 of FIG. 6 includes planar electrical resistor 112 as the electrical resistor, in place of heating wire 110 of FIG. 5. Steering wheel heater 103 of FIG. 6 is different from the configuration of FIG. 5 in that the capacitance is large, and thus can further enhance the sensitivity of the sensor circuit. If steering wheel heater 103 of FIG. 6 has few inductance components, inductor La may be connected to steering wheel heater 103, without being omitted.

Figure 7A:
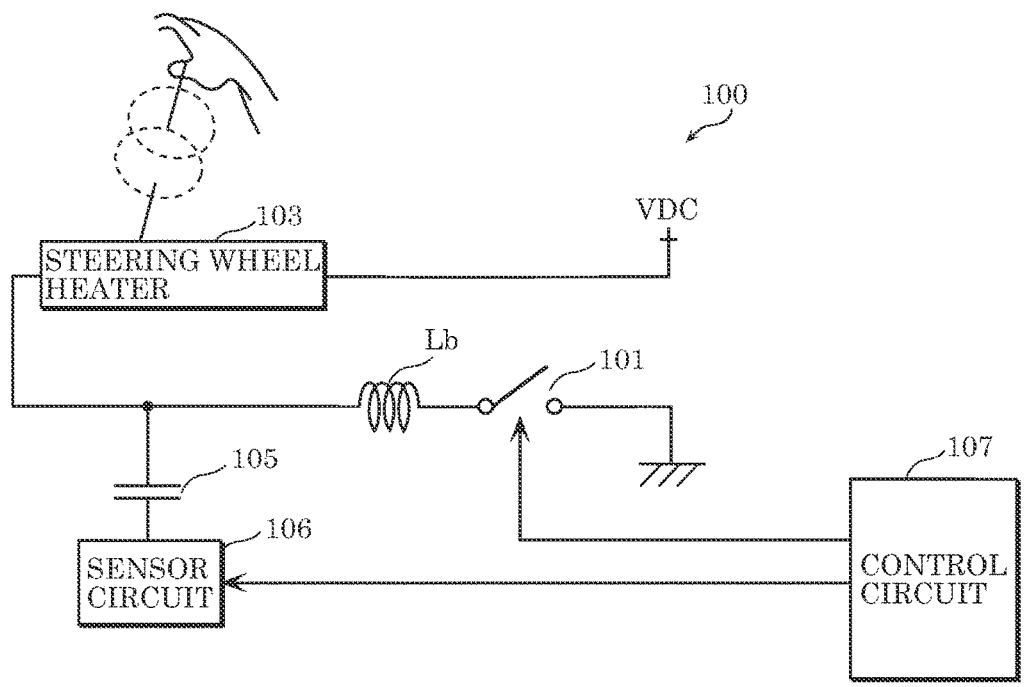
FIG. 7A is a block diagram of variation 1 to the steering wheel heater device according to exemplary embodiment 1.

Next, a variation of steering wheel heater device 100 is described. FIG. 7A is a block diagram of variation 1 to steering wheel heater device 100 according to exemplary embodiment 1. Steering wheel heater device 100 shown in FIG. 7A is the same as that shown in FIG. 2, except that inductor La is eliminated and the second terminal of steering wheel heater 103 is connected to power source VDC. Inductor La may not be included as shown in FIG. 7A if steering wheel heater 103 have inductance components. Variation 1 is suitable for a steering wheel heater that has inductance components, that is, for the first configuration example of steering wheel heater 103 shown in FIG. 5.

Figure 7B:
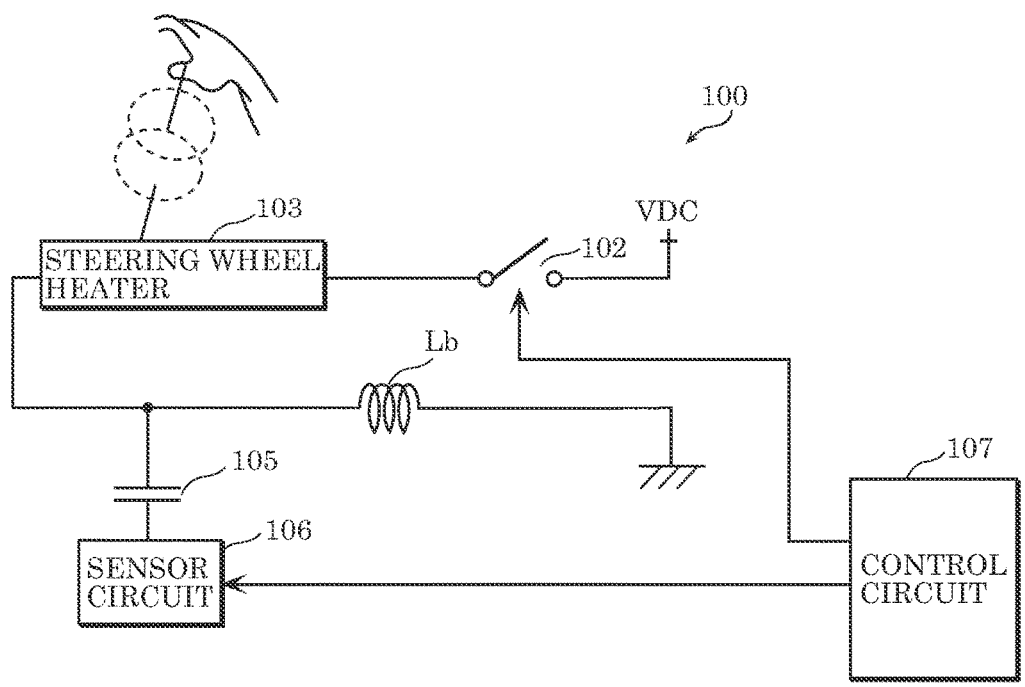
FIG. 7B is a block diagram showing another example of variation 1 to the steering wheel heater device according to exemplary embodiment 1.

FIG. 7B is a block diagram of another example of variation 1 to steering wheel heater device 100 according to exemplary embodiment 1. Steering wheel heater device 100 shown in FIG. 7B is the same as that shown in FIG. 7A, except that switch 101 is eliminated and switch 102, connected in series to the second terminal of steering wheel heater 103, is added. The other example of variation 1 is also suitable for the first configuration example of steering wheel heater 103 shown in FIG. 5.

Figure 7C:
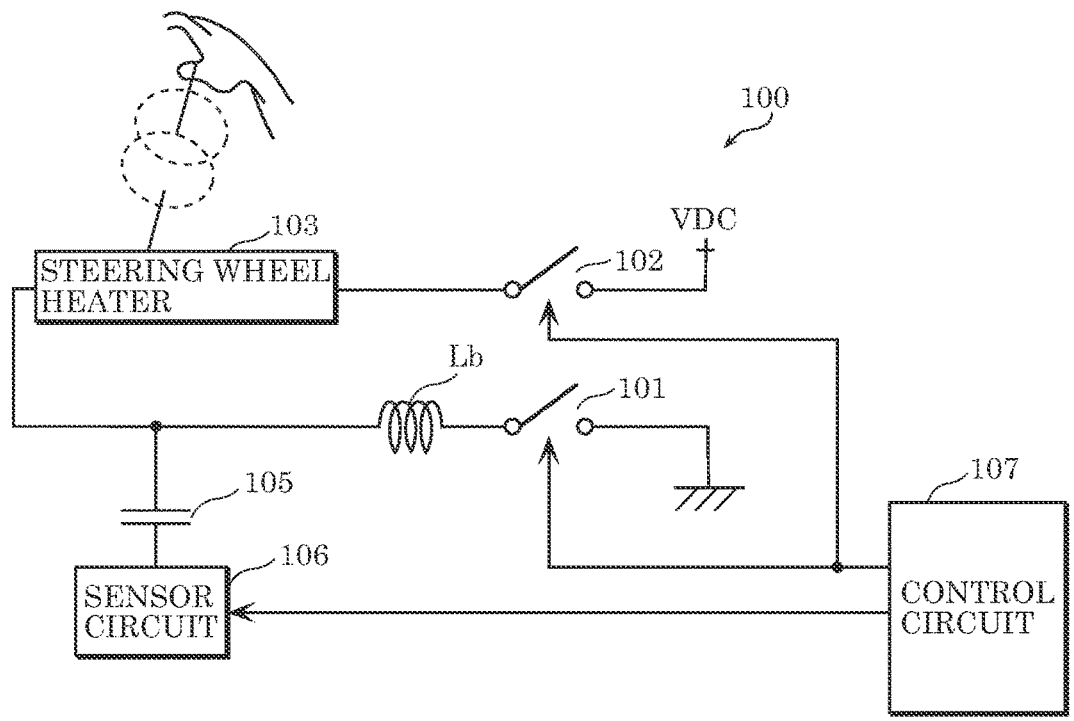
FIG. 7C is a block diagram of still another example of variation 1 to the steering wheel heater device according to exemplary embodiment 1.

FIG. 7C is a block diagram of still another example of variation 1 to steering wheel heater device 100 according to exemplary embodiment 1. Steering wheel heater device 100 shown in FIG. 7C is the same as that shown in FIG. 7A, except that switch 102, connected in series to the second terminal of steering wheel heater 103, is added. The still other example of variation 1 is also suitable for the first configuration example of steering wheel heater 103 shown in FIG. 5.

As shown in FIGS. 7A through 7C, steering wheel heater device 100 may include at least one switch. Specifically, the at least one switch may be at least one of switch 101 connected in series via inductor Lb to the first terminal of steering wheel heater 103 and switch 102 connected in series to the second terminal of steering wheel heater 103. In the case where steering wheel heater device 100 includes two switches 101 and 102 to supply a direct current to steering wheel heater 103, that is, to turn on the supply of power to steering wheel heater 103, control circuit 107 turns on both switches 101 and 102 connected in series to steering wheel heater 103. Meanwhile, in the above case, to block the direct current supplied to steering wheel heater 103, that is, to turn off the supply of power to steering wheel heater 103, control circuit 107 may turn off either one of or both switches 101 and 102 connected in series to steering wheel heater 103.

Moreover, as shown in FIGS. 7A through 7C, the second terminal mentioned above may be connected to the switch or the power line, without an intervening inductive element. Moreover, power source VDC and the ground may be connected conversely.

Figure 8:
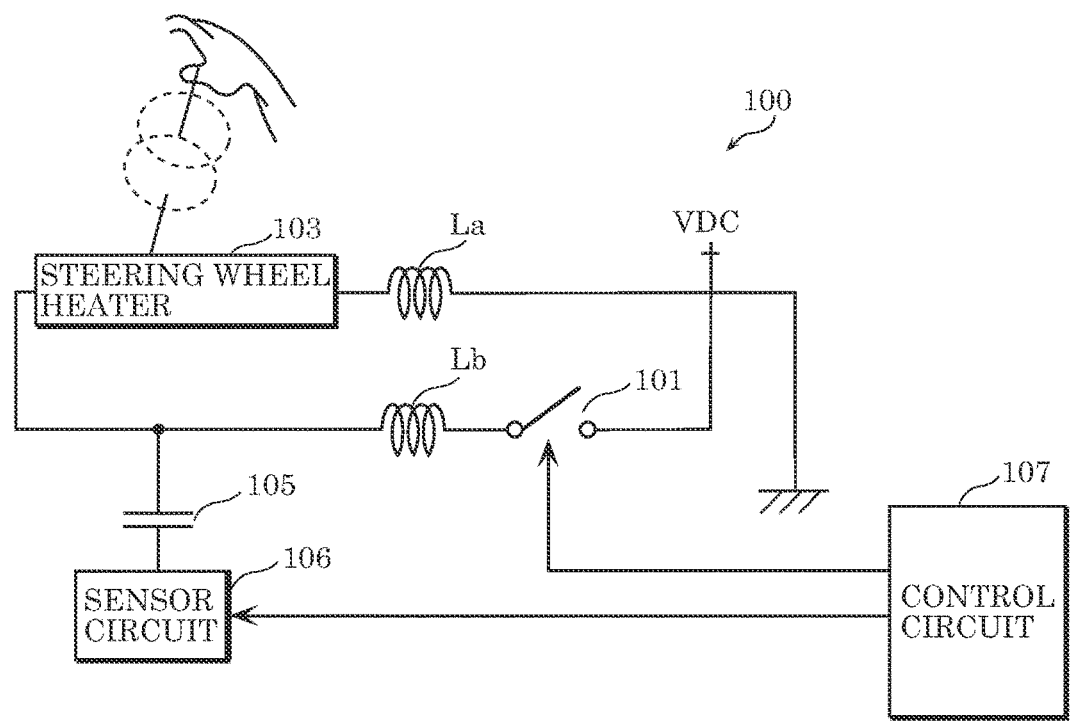
FIG. 8 is a block diagram of variation 2 to the steering wheel heater device according to exemplary embodiment 1.

FIG. 8 is a block diagram of variation 2 to the steering wheel heater device according to exemplary embodiment 1. Steering wheel heater device 100 shown in FIG. 8 is the same as that shown in FIG. 2, except that power source VDC and a ground potential are connected conversely. Variation 2 is suitable for both the first and second configuration examples of steering wheel heater 103 shown in FIG. 5 and FIG. 6, respectively.

Figure 9:
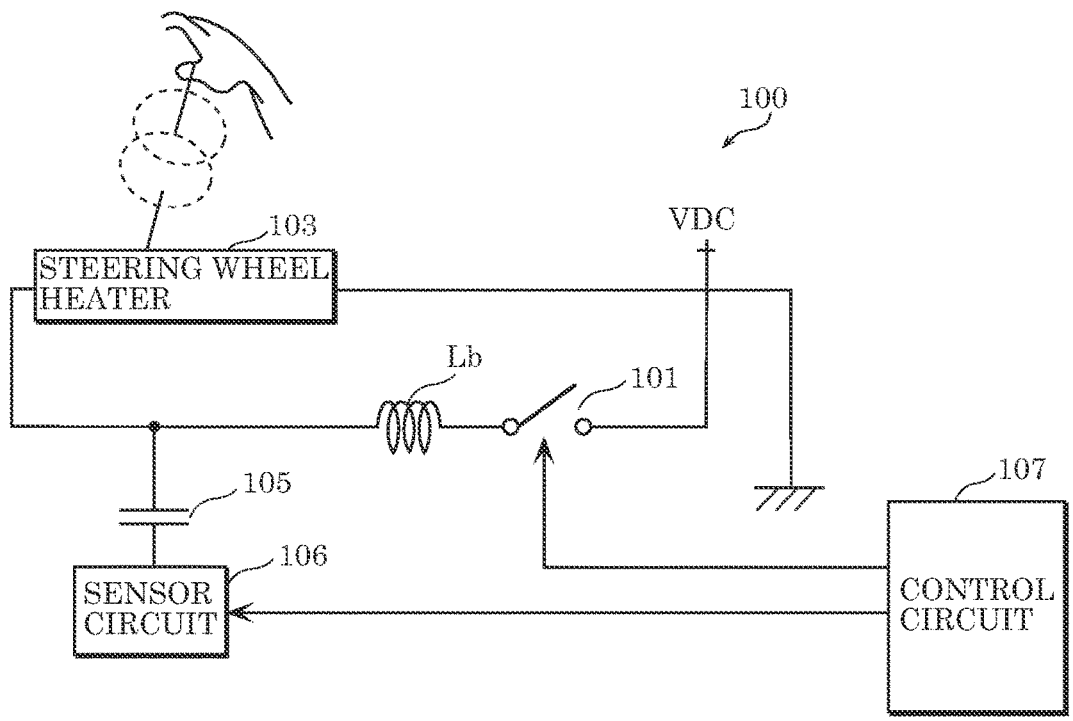
FIG. 9 is a block diagram of variation 3 to the steering wheel heater device according to exemplary embodiment 1.

FIG. 9 is a block diagram of variation 3 to the steering wheel heater device according to exemplary embodiment 1. Steering wheel heater device 100 shown in FIG. 9 is the same as variation 1 shown in FIG. 7A, except that power source VDC and the ground potential are connected conversely. Variation 3 is suitable for the first configuration example of steering wheel heater 103 shown in FIG. 5.

As described above, the steering wheel heater device according to the present embodiment includes inductor La and inductor Lb which are connected to the first terminal and the second terminal, respectively, of steering wheel heater 103 as shown in FIG. 2. Sensor circuit 106 for detecting contact and proximity of the human hand to the steering wheel is connected between inductor Lb and one end of steering wheel heater 103. Sensor circuit 106 provides steering wheel heater 103 with the AC signal as, for example, a detection signal to detect the magnitude or changes in coupling capacitor.

Inductor Lb functions as high impedance to the detection signal when steering wheel heater 103 is used as a sensor, that is, as an electrode of the capacitance. This allows the detection, irrespective of whether switch 101 is on or off.

Inductor Lb reduces the effects of the parasitic capacitance of switch 101 when switch 101 is off.

The inductance values of inductors La and Lb may be determined such that sensor circuit 106 can have practically sufficient sensitivity for contact detection using the detection signal output from sensor circuit 106. For example, if the detection signal output from sensor circuit 106 has a frequency of 5 MHz, inductors La and Lb can be set to have inductance values of 10 μH (micro-henrys).

It should be noted that if steering wheel heater 103 has sufficiently large inductance components, as shown in the examples of FIGS. 5, 7A through 7C, and 9, inductor La not connected to sensor circuit 106 may be replaced with the inductance components of steering wheel heater 103 itself.

Moreover, control circuit 107 may switch between on and off of switch 101 based on a detection result made by a temperature sensor (not shown) measuring a temperature of steering wheel heater 103 to provide control such that the temperature of steering wheel heater 103 is maintained at a certain temperature. Transient noise components different from the detection signal are detected by sensor circuit 106 when switch 101 is to be switched to on or off. The effects of power supply components can be avoided by suspending the sensing or discarding data. Therefore, as shown in FIG. 3, sensor circuit 106 and the on and off of steering wheel heater 103 may be synchronized under control of control circuit 107.

Moreover, the effects of the parasitic capacitance of switch 101 varies, and thus sensor circuit 106 better previously have learned values as to the detection conditions in the on-state and the off-state of switch 101 because variations in sensor value across the on-state and the off-state can be detected.

Exemplary Embodiment 2

Figure 10:
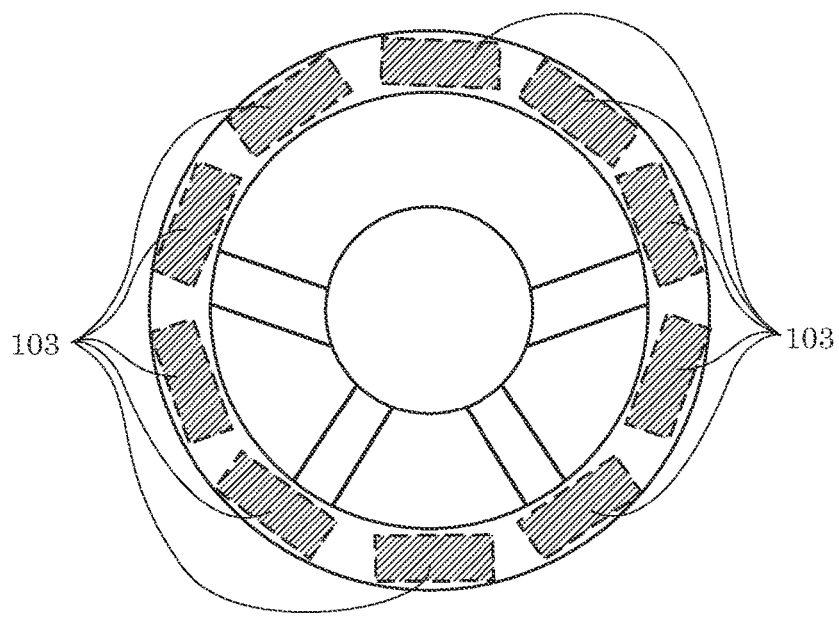
FIG. 10 is a diagram showing an example of a steering wheel which includes steering wheel heaters doubling as devices for detecting whether a human hand is in contact with the steering wheel, according to exemplary embodiment 2.

FIG. 10 is a diagram showing an example of a steering wheel which includes steering wheel heaters doubling as devices for detecting whether a human hand is in contact with the steering wheel, according to exemplary embodiment 2. The steering wheel in the figure includes a plurality of steering wheel heaters 103 on different positions. The plurality of steering wheel heaters 103 may be disposed covering the circumference of the steering wheel or may be disposed covering primary portions to be held by an operator. In the figure, ten steering wheel heaters 103 are disposed covering substantially the full circumference of the steering wheel.

Figure 11A:
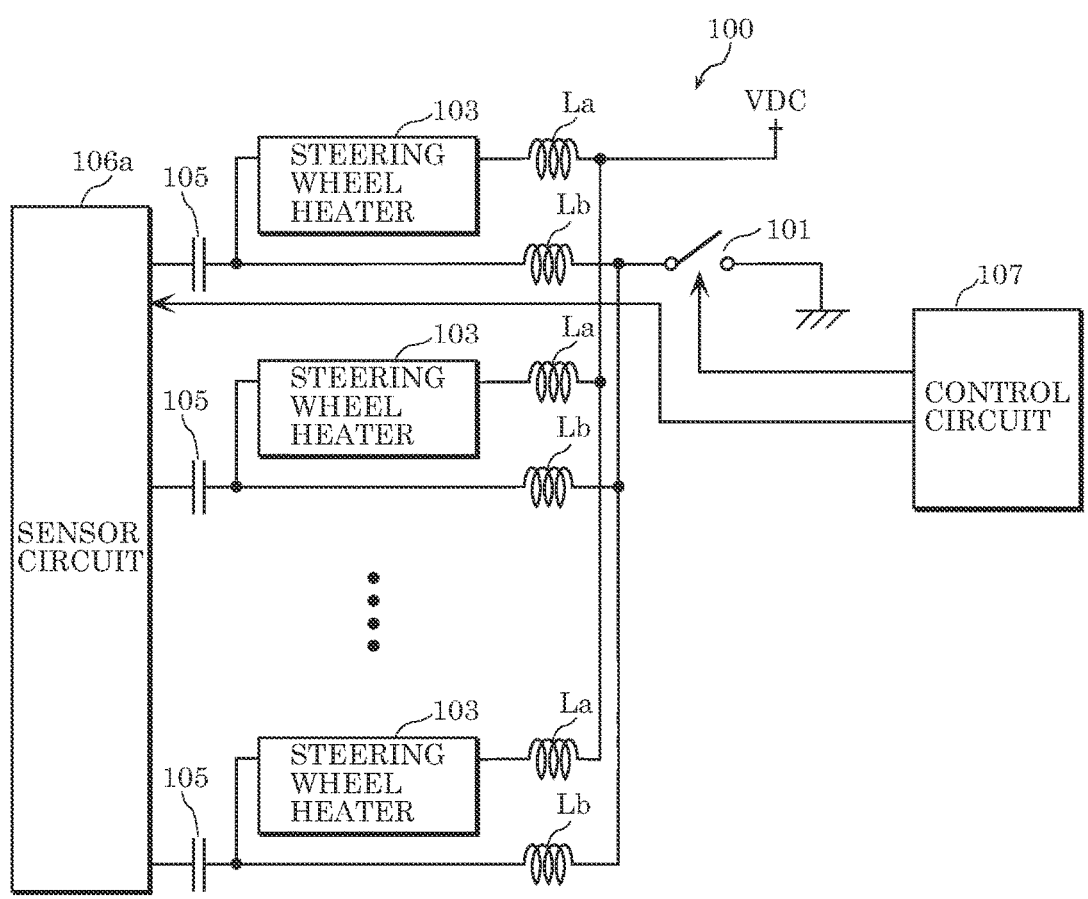
FIG. 11A is a block diagram of a configuration example of a steering wheel heater device according to exemplary embodiment 2.

FIG. 11A is a block diagram of a configuration example of steering wheel heater device 100 according to exemplary embodiment 2. The configuration example of the figure corresponds to the plurality of steering wheel heaters 103 shown in FIG. 10.

Steering wheel heater device 100 in the figure includes a plurality of sets of steering wheel heaters 103, inductor La, inductor Lb, and coupling capacitor 105, and further includes switch 101, sensor circuit 106a, and control circuit 107 which are shared between the sets. Ten sets of the configuration example of FIG. 11A correspond to FIG. 10.

Sensor circuit 106a may be included as many as the number of sets of sensor circuits 106 shown in FIG. 4. Alternatively, sensor circuit 106a may include at least one sensor circuit 106 shown in FIG. 4 and detects whether a human hand is in contact with the steering wheel in a time-sharing manner. For example, given that sensor circuit 106a as many as the number of sets of sensor circuits 106 are included in steering wheel heater device 100, control circuit 107 provides control during the ON periods shown in FIG. 3, in a manner that sensor circuits 106 are enabled one by one in a time-sharing manner. Enabling sensor circuit 106 as used herein may control for placing sensor circuit 106 in a suspended state into an active state, control for loading a determination result made by one sensor circuit while the plurality of sensor circuits 106 are in the active state, that is, control for obtaining a determination result made by one sensor circuit without masking it.

Control circuit 107 causes sensor circuit 106a to operate while switching between the plurality of steering wheel heaters 103 in the time-sharing manner within valid periods as shown in the timing diagram of FIG. 3. Alternatively, control circuit 107 may enable sensor circuit 106a in a manner that sensor circuit 106a determines whether the human hand is in contact with the steering wheel, concurrently using at least two of the plurality of steering wheel heaters 103.

With this configuration, in addition to the similar effects to those obtained from exemplary embodiment 1, a portion of the steering wheel being held by the operator can be detected in more detail since steering wheel heater device 100 includes the plurality of steering wheel heaters 103. Moreover, a location on the steering wheel where the human hand approaches can be detected in more detail.

For example, whether the steering wheel is being held with hands, the right hand, or the left hand, and a portion of the steering wheel being held can be detected. If history of portions of the steering wheel being held is recorded in association with movement of the steering wheel, habits and tendencies of the operator under normal conditions or in the event of an accident can be analyzed. The history may be recorded in conjunction with an event data recorder. The information on the holding of the steering wheel of a vehicle or the like equipped with steering wheel heater device 100 may be transmitted externally and utilized by a device external to the vehicle or the like.

As such, according to the present embodiment, a portion of the steering wheel being held or approached by the operator can be determined in more detail.

Next, a variation to steering wheel heater device 100 according to exemplary embodiment 2 is described.

Figure 11B:
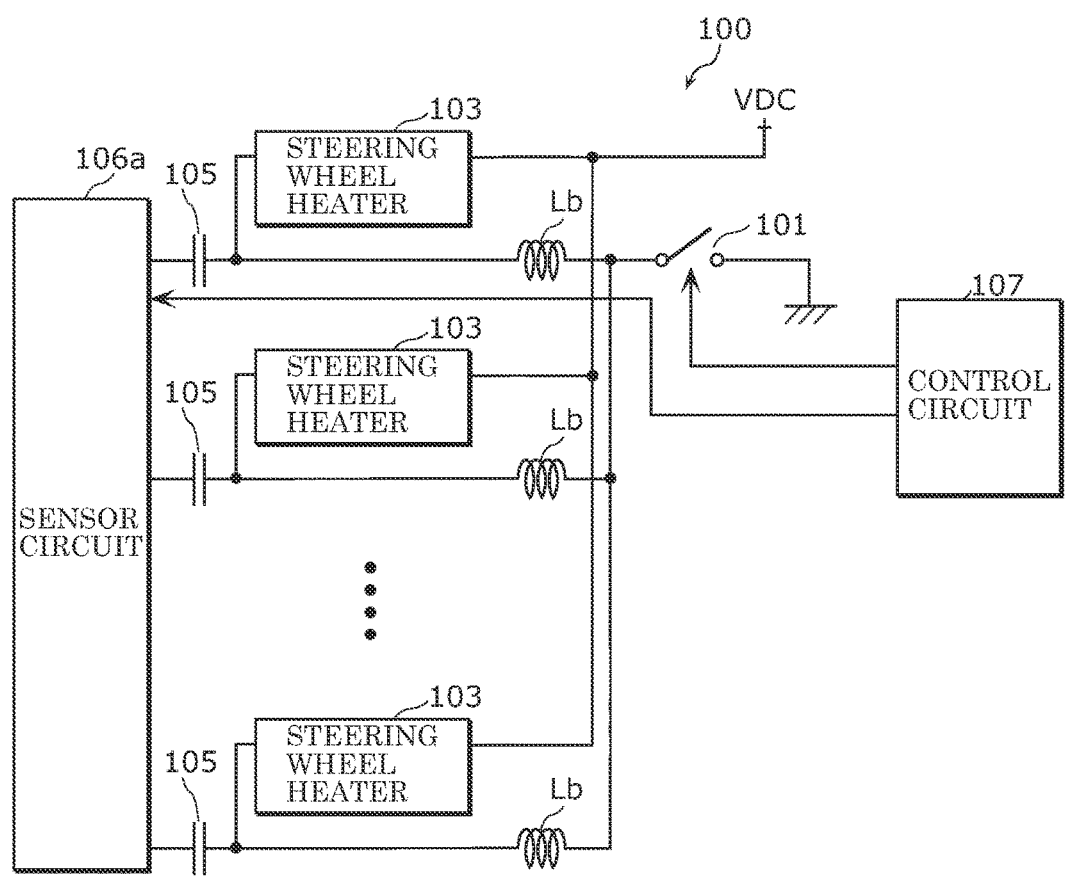
FIG. 11B is a block diagram of variation 1 to the steering wheel heater device according to exemplary embodiment 2.

FIG. 11B is a block diagram of variation 1 to the steering wheel heater device according to exemplary embodiment 2. Steering wheel heater device 100 shown in FIG. 11B is the same as that shown in FIG. 11A, except that the plurality of inductors La are eliminated. If steering wheel heater 103 have inductance components, inductors La may not be included as shown in FIG. 11A. Variation 1 is suitable for a steering wheel heater that includes inductance components, that is, the first configuration example of steering wheel heater 103 shown in FIG. 5.

Figure 11C:
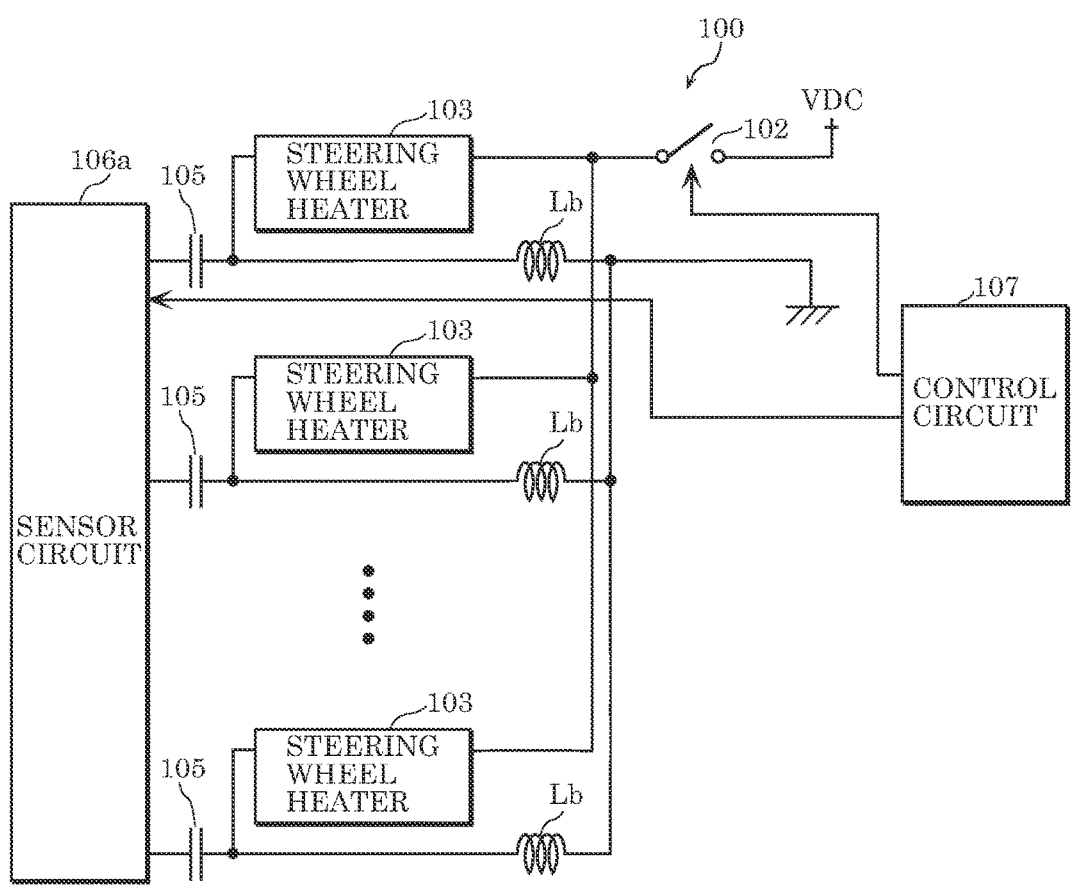
FIG. 11C is a block diagram of variation 2 to the steering wheel heater device according to exemplary embodiment 2.

FIG. 11C is a block diagram of variation 2 to the steering wheel heater device according to exemplary embodiment 2. Steering wheel heater device 100 shown in FIG. 11C is the same as that shown in FIG. 11B, except that switch 101 is eliminated and switch 102 connected in series to second terminals of the plurality of steering wheel heaters 103 is added. Variation 2 is also suitable for the first configuration example of steering wheel heater 103 shown in FIG. 5.

Figure 11D:
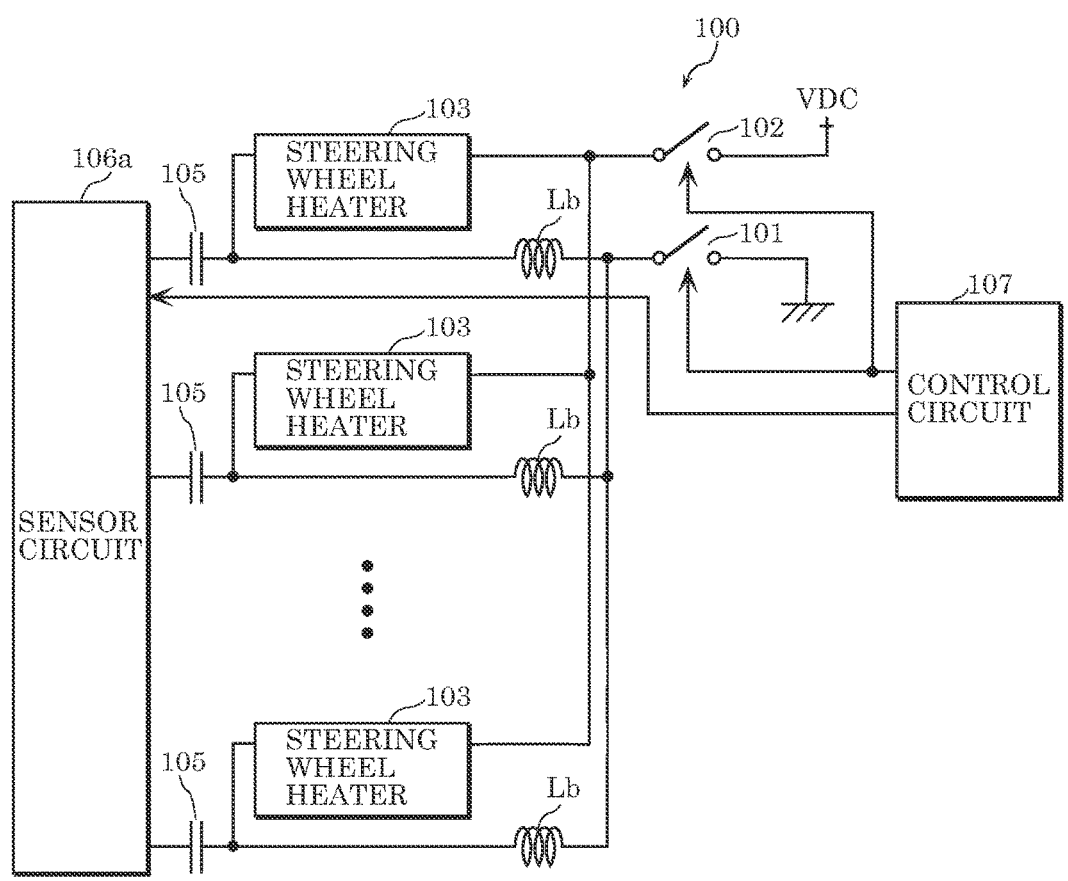
FIG. 11D is a block diagram of variation 3 to the steering wheel heater device according to exemplary embodiment 2.

FIG. 11D is a block diagram of variation 3 to the steering wheel heater device according to exemplary embodiment 2. Steering wheel heater device 100 shown in FIG. 11D is the same as that shown in FIG. 11B, except that switch 102, connected in series to the second terminals of the plurality of steering wheel heaters 103, is added. Variation 3 is also suitable for the first configuration example of steering wheel heater 103 shown in FIG. 5.

As shown in FIGS. 11B through 11D, steering wheel heater device 100 may include at least one switch. Specifically, the at least one switch may be at least one of switch 101 connected via individual inductors Lb to first terminals of the plurality of steering wheel heaters 103, and switch 102 connected to the individual second terminals of the plurality of steering wheel heaters 103.

Moreover, as shown in FIGS. 11B through 11D, the plurality of second terminals may be connected to the switch or the power line, without intervening inductive elements. Power source VDC and the ground may be connected conversely. In FIG. 11A also, power source VDC and the ground may be connected conversely.

Moreover, a part or the whole of sensor circuits 106 and 106a may be implemented with a microcomputer or one LSI (Large Scale Integration) chip.

While sensor circuits 106 and 106a are connected via coupling capacitor 105 to the first terminal of steering wheel heater 103, a diode may be used, in place of coupling capacitor 105. In this case the diode has an anode connected to sensor circuit 106, and a cathode connected to the first terminal mentioned above. Alternatively, coupling capacitor 105 may be eliminated and sensor circuit 106 may be directly connected to the first terminal.

While steering wheel heater device 100 according to one or more aspects of the present disclosure has been described with reference to the exemplary embodiments, the present disclosure is not limited to the exemplary embodiments. Various modifications to the exemplary embodiments that may be conceived by a person skilled in the art or combinations of the components of different exemplary embodiments are intended to be included within the scope of one or more aspects of the invention, without departing from the spirit of the present disclosure.

Moreover, while the description has been given that power source VDC supplies the direct-current electrical energy in exemplary embodiments 1 and 2, the term "the direct current" refers not only to a direct current, in a narrow sense, which has constant-value voltage or constant-value current, but also a direct current, in a broad sense, which has slight changes in electrical energy, such as ripples and a pulsating current.

Moreover, the description has been given that the electrical energy supplied to steering wheel heater 103 is a direct current in exemplary embodiments 1 and 2, the same effects as those obtained from the exemplary embodiments 1 and 2 are obtained by supplying steering wheel heater 103 with an alternating-current electrical energy varying over a long period (i. e., having a low frequency). This is because a long period of electrical energy supplied passes inductors La and Lb, and thus can drive steering wheel heater 103. The long period as used herein is a period fairly long as compared to the period of the AC signal output by sensor circuit 106, for example, a period longer by three orders of magnitude.

Moreover, while described herein as "whether a human hand is in contact with steering wheel heater 103 is determined" in exemplary embodiments 1 and 2, the steering wheel heater device can determine whether contact is made between steering wheel heater 103 and anything that changes the capacitance of steering wheel heater 103. Thus, the detected subject for contact determination is not limited to a human hand.

INDUSTRIAL APPLICABILITY

The present disclosure is applicable as a steering wheel heater device or the like to be included in a steering wheel of a vehicle or the like and for determining whether a detected subject, such as a human hand, is in contact with the steering wheel.

REFERENCE MARKS IN THE DRAWINGS

100 steering wheel heater device
101, 10 switch
103 steering wheel heater
105 coupling capacitor
106, 106a sensor circuit
107 control circuit
111 support
111a connecting member
110 heating wire
112 planar electrical resistor
130 electrical charge injector
131 pulse generator
132, 133 switch
140 smoothing circuit
150 A/D converter
160 determinator
La, Lb inductor

The invention claimed is:

1. A steering wheel heater device comprising:
a plurality of steering wheel heaters each configured of an electrical resistor which produces heat by electrical energy, each of the plurality of steering wheel heaters connected in parallel and having a first terminal and a second terminal, and each of the plurality of steering wheel heaters being included in a steering wheel;
a plurality of first inductors, each one of the plurality of first inductors being separately connected in series to each one of the respective first terminal of each of the plurality of steering wheel heaters;
at least one switch for turning on and off supply of power to the plurality of steering wheel heaters, the at least one switch being at least one of a first switch connected in series via the plurality of first inductors to the first terminal of each of the plurality of steering wheel heaters or a second switch connected in series to the second terminal of each of the plurality of steering wheel heaters;
a sensor circuit electrically connected to each of the first terminals of the plurality of steering wheel heaters via a capacitor, for determining whether a detected subject is in contact with the steering wheel, based on a magnitude of capacitance of each of the plurality of steering wheel heaters, the sensor circuit including: an electrical charge injector; a smoothing circuit connected to the electrical charge injector and the capacitor; an analog-to-digital converter connected to the smoothing circuit; and a determination sensor connected to the analog-to-digital converter and configured to determine whether the detected subject is in contact with the steering wheel; and
a control circuit connected to the sensor circuit, in operation, controlling operation of the sensor circuit by an enable signal, wherein
the control circuit, in operation:
determines valid periods in each of which the sensor circuit determines whether the detected subject is in contact with the steering wheel, wherein each of the valid periods excludes transitions from an off-state where the supply of power to the plurality of steering wheel heaters is stably off to a stable on-state where the supply of power to the plurality of steering wheel heaters is stably on, and transitions from the stable on-state to the off-state,
enables, via the enable signal, the sensor circuit during the valid periods such that the sensor circuit determines whether the detected subject is in contact with the steering wheel during the valid periods, and
invalidates, via the enable signal, the determination made by the sensor circuit during the transitions.

2. The steering wheel heater device according to claim 1, wherein
the second terminal of each of the plurality of steering wheel heaters is connected to the second switch or a power line, without an intervening inductive element.

3. The steering wheel heater device according to claim 1, wherein
each of the plurality of steering wheel heaters includes a heating wire connected between the first terminal and the second terminal and that is repeatedly bent.

4. The steering wheel heater device according to claim 1, wherein
each of the plurality of steering wheel heaters includes a planar electrical resistor connected between the first terminal and the second terminal.

5. The steering wheel heater device according to claim 1, wherein
the sensor circuit outputs an alternating-current signal to each of the plurality of steering wheel heaters via the first terminal and detects a level of a signal input from each of the plurality of steering wheel heaters via the first terminal to determine whether the detected subject is in contact with the steering wheel.

6. The steering wheel heater device according to claim 1, wherein
the electrical energy is direct-current electrical energy.

* * * * *